Sept. 6, 1927.
O. WITTEL
1,641,405
REEL HOLDING STRUCTURE FOR PROJECTORS
Filed Nov. 2, 1925
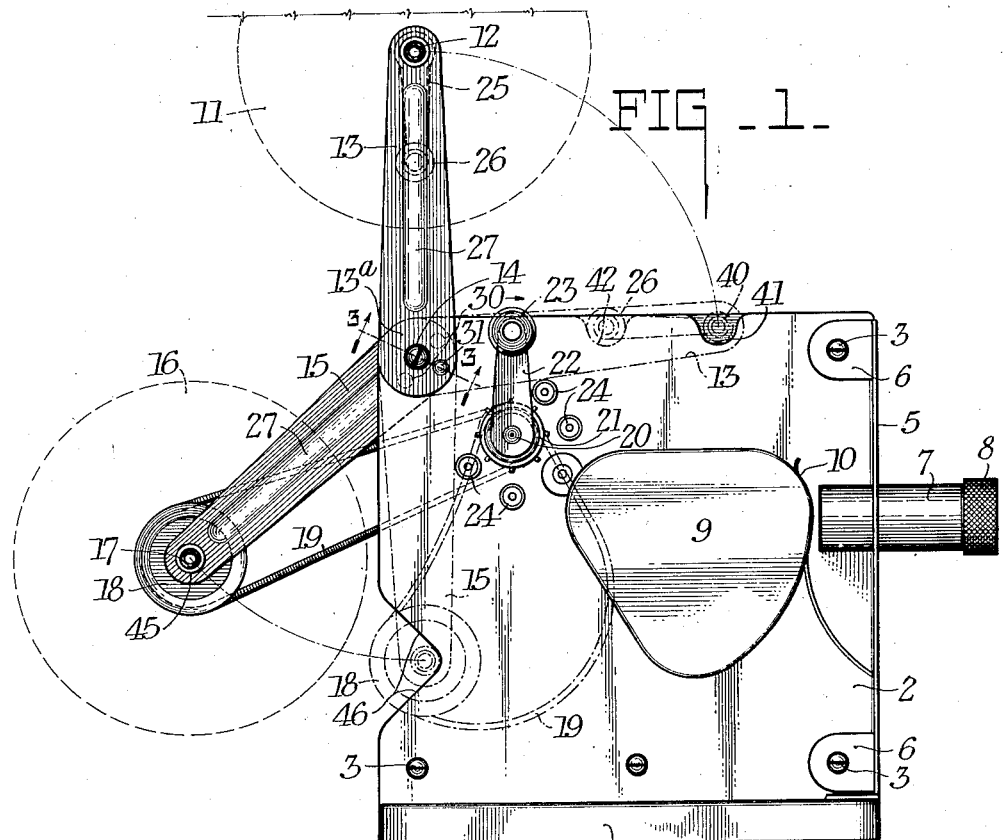
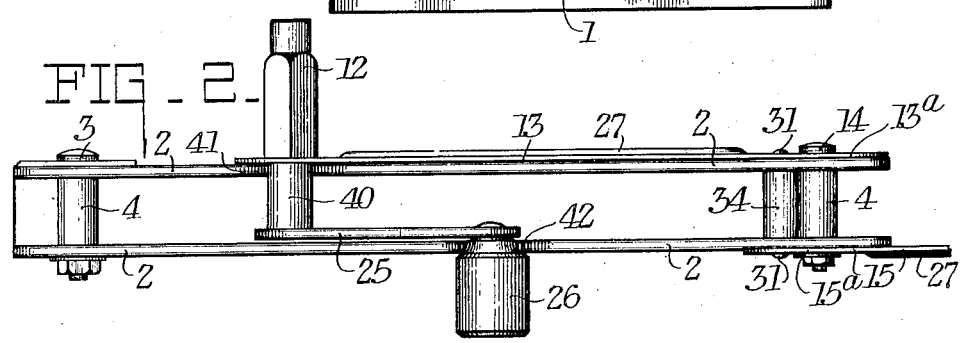
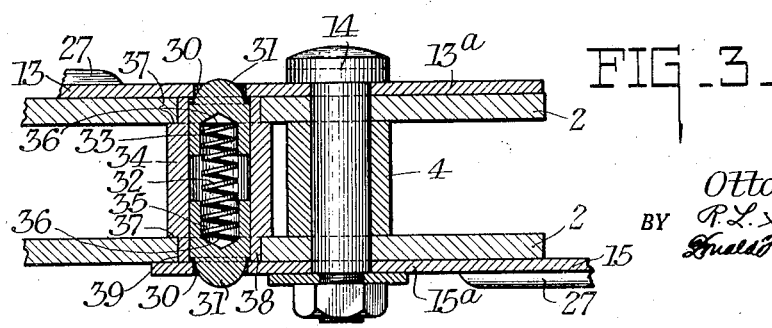
INVENTOR,
Otto Wittel,
BY P. L. Stinchfield
Donald H. Stewart
ATTORNEYS.

Patented Sept. 6, 1927.

1,641,405

UNITED STATES PATENT OFFICE.

OTTO WITTEL, OF ROCHESTER, NEW YORK, ASSIGNOR TO EASTMAN KODAK COMPANY, OF ROCHESTER, NEW YORK, A CORPORATION OF NEW YORK.

REEL-HOLDING STRUCTURE FOR PROJECTORS.

Application filed November 2, 1925. Serial No. 66,155.

This invention relates to photography and more particularly to projection machines for motion pictures. One object of my invention is to provide a reel holding structure suitable for compact motion picture projecting machines especially adapted for home use. Another object is to provide a projector in which the reel supporting arms may be folded against the body of the machine when not in use and in which they may be firmly latched in an operative position extending from the body. Another object is to provide suitable arm receiving seats in the projector body for the arms when in a folded position. Another object is to provide a simple and reliable latch to retain the arms in an operative position, and other objects will appear hereinafter from the following specification, the novel features being particularly pointed out in the claims at the end thereof.

Coming now to the drawings, wherein like reference characters denote like parts throughout:

Fig. 1 is a side elevation of a compact type of motion picture projector having a reel supporting structure constructed in accordance with, and embodying one form of my invention;

Fig. 2 is a top plan view on an enlarged scale of a portion of the projector showing parts of the reel supporting structure; and Fig. 3 is an enlarged detail section showing the latching structure taken on line 3—3 of Fig. 1.

In the embodiment shown in the drawing, the projector may consist of a base 1 upon which a pair of plates 2 are supported, these plates being held together by means of bolts 3 which pass through tubular separating members 4. As shown in Fig. 1, one of the plates 2 supports a flange 5 by means of bent over lugs 6. This flange carries a tube 7 inside of which there is an objective which may be focused by turning the knurled member 8. A housing 9, supported on a plate 2, contains the pull-down mechanism, and on the front of the housing there is a curved projection gate 10. A suitable light source and condenser system is mounted on plate 2 opposite the housing 9. This is not illustrated, as it does not form a part of the present invention.

Coming now to my invention, a supply reel 11 is carried upon a shaft 12 supported by arm 13 which is pivoted upon the bolt 14, which, as best shown in Fig. 3, passes through both of the supporting plates 2. This bolt also forms a pivot for the arm 15 which carries a take-up reel 16 on the shaft 17. There is also affixed to this shaft a pulley 18 which may be turned by a wire belt 19 passing around a pulley lying between the plates 2 (not shown) and supported upon a shaft 20. Shaft 20 likewise carries a sprocket 21, crank 22, and handle 23. The projector mechanism may be operated manually by rotating the handle 23.

Film is led from the supply reel 11 over the sprocket 21 beneath the guide rolls 24 around the housing 9, through gate 10 and then again over the sprocket 21 above the guide rolls 24 and thence to the take-up spool 16. By turning the handle 23, in the direction shown by the arrow, the film will be intermittently drawn past the gate 10 for projecting motion pictures.

After the supply reel 11 has become exhausted, the film is threaded directly from reel 16 to reel 11 and the wire belt 19 is disengaged from pulley 18. Reel 11 may then be rotated by means of a crank 25 which may be operated by handle 26 to wind the film back from the take-up to the supply spool.

I prefer to emboss the arms 13 and 15 at 27, since this materially strengthens them.

In order to latch the arms in the operative position shown in Fig. 1, I provide a structure shown in Fig. 3. The arms 13 and 15 turn upon the bolt 14 as previously described. Each of these arms is perforated at 30 so that the latching members 31 may snap into these apertures under the impulse of a spring 32 when the arms and latch come into operative position. The latching members 31 are preferably screw machine parts having a shank 33 adapted to ride in a tube 34 and having an aperture 35 adapted to receive the ends of a spring 36 which tends to thrust the latches from each other. The body portion of the latches, is however, unable to pass through the apertures 30. This prevents them from becoming displaced. I prefer to form the tubular member 34 with shoulders 37 which contact with the plates. The tubular extensions 38 form the shoulders tightly fitted into apertures 39 in the plates 2.

When it is desired to fold the arms 13 and 15, the reels 11 and 16 are removed from their supporting shafts and the knobs 31 are pressed towards each other, permitting the arms to be folded about bolt 14.

As shown in Figs. 1 and 2, arm 13 may be turned until the shaft 40 which carries the crank 25 and handle 26, may lie in a notch 41 cut in the plate 2. At the same time, the handle 26 may turn until it engages a notch 42 which is cut in the opposite plate 2. In this way, the arm may lie in the position shown in dot and dashed lines in Fig. 1.

Arm 15 lies on the opposite side of the supporting plates 2 from arm 13. When the knob 31 is released, this arm may swing downwardly until the shaft 45, which carries the reel supporting shaft 17, lies in a pair of notches 46 cut in the plates 2. In this position, the pulley member 18 will lie on the outside of the far plate 2 (Fig. 1) and the belt 19 will hang loosely.

It will be noted that the arms 13 and 15 have a substantial area 13ª and 15ª which contacts with the support,—that is, with the two spaced plates 2. When in an operative position, the arms are latched in position by the spring pressed buttons 31, as above described. When the latch is released, and an arm is moved about the bolt 14, the latching button 31 is pressed against the area which lies against the support so as to form a frictional brake which will tend to hold the arm in the position to which it is moved. It is, therefore, not necessary to have a positive latch to hold the parts in their folded position (shown in dot and dashed lines). The friction created by the spring button 31 pressing upon the inside arm surface 13ª or 15ª serves to hold the parts in their folded positions.

It will be further noted that the arms 13 and 15 which form the reel supports and that the handle 26 and crank 25 when folded lie within the boundaries of the supporting frame composed of the spaced plates 2—2. As the projector mechanism, which, in the present embodiment of my invention with exception of the objective also lies within the boundaries of support, this apparatus is free from protuberances so that it may be readily packed. Such a structure also renders it easy to design a suitable container or carrying case in which it may be protected and transported.

From the above description it will be seen that I have provided a simple latching mechanism which can be readily actuated and which will hold the reel arm rigidly in an operative position. When folded, the parts project a minimum distance from the body of the projection machine.

Having thus described my invention, what I claim as new and desire to secure by Letters Patent is:

1. In a motion picture projection machine, the combination with a support having two angularly disposed edges, of a pair of reel supporting arms, a bolt carried by the support near the angularly disposed edges and upon which the arms are pivoted, and snap latches adapted to engage and hold the arms in an operative position, said latches being releasable whereby the arms may be folded against the angularly disposed edges.

2. In a motion picture projection machine, the combination with a support having angularly disposed edges, of a pair of apertured reel supporting arms, a bolt upon which the arms are pivotally mounted, a snap latch adjacent the bolt having a pair of latching members, said latching members being positioned to ride on the arms as they are turned upon the bolt to and from a position in which the arms lie against the walls, being adapted to snap into the apertures to latch the arms in an operative position.

3. In a motion picture apparatus, the combination with a support, a bolt mounted on the support, an arm pivoted upon the bolt, a substantial area of the arm contacting with the support about the bolt, a snap latch carried by the support, a spring for pressing the latch against the arm about the bolt, and a latch engaging wall forming a part of the arm and cooperating with the snap latch to hold the arm in one position.

4. In a motion picture apparatus, the combination with a support comprising spaced plates, of a bolt passing through these plates, a pair of arms mounted to turn upon the bolt and having apertures therein, a tubular member extending between the plates, latching members slidably mounted in the tubular member, and a spring tending to separate the latching members whereby they may snap into the apertures in the arms when the arms are turned to one position.

5. In a motion picture apparatus, the combination with a support, arms pivoted to the support and adapted to move upon their pivots to an inoperative and to an operative position, reel supporting members carried by the arms, seats for the reel supporting members in the support and engageable by the reel supporting members by turning the arms about their pivots.

6. In a motion picture apparatus, the combination with a support, of a reel supporting arm mounted upon each side thereof, a bolt upon which the arms are supported, reel carrying and operating devices supported on the arms, and seats cut in the support and lying in the paths of the reel carrying and operating devices of the arms into which these parts may lie when the arms are turned upon the bolt to lie flat, one on each side of the support.

7. In a motion picture apparatus, the combination with a support, of seats formed in the support, an arm pivoted on each side of the support, means for holding the arms in an operative position including latch members, said means being releasable for folding the arms flat against the support, into the seats in the support.

8. In a motion picture apparatus, the combination with a support, of a pair of reel supporting arms pivotally attached to the support, walls for cooperating with latch members in each arm, and a double acting snap latch comprising a pair of latching members adapted to function in different directions and adapted to engage the walls of the reel supporting arms to latch them in an operative position.

9. In a motion picture apparatus, the combination with a support, of an apertured reel carrying arm pivotally attached thereto and a latch mechanism adapted to cooperate with the apertured arm to retain it in an operative position, said latch mechanism comprising a tubular member, a latch member slidable therein having a rounded head extending from a shoulder, said head being adapted to engage the aperture of the arm, said shoulder being of larger diameter than said aperture, a spring for forcing the latch member into engagement with the arm, whereby when the arm is moved to one position the latch may snap into the aperture, the latch being releasable by manually depressing the rounded head.

10. In motion picture apparatus, the combination with a support, of a pair of reel supporting arms hinged thereto and adapted to be separately swung to operative and inoperative positions, and a latching mechanism adapted to cooperate with both arms to hold them in one of said positions.

11. In motion picture apparatus, the combination with a support, of a pair of reel supporting arms hinged thereto and adapted to be separately swung to operative and inoperative positions, and a latching mechanism adapted to cooperate with both arms to hold them in an operative position.

12. In motion picture apparatus, the combination with a support, of a pair of reel supporting arms hinged thereto and adapted to be separately swung to operative and inoperative positions, and a latching mechanism adapted to cooperate with both arms to hold them in an operative position, said latching mechanism being also adapted to frictionally engage the arms retaining them in their inoperative positions.

13. In motion picture apparatus, the combination with a support, of a reel supporting arm pivotally attached thereto, said arm having a surface adapted to contact with the supporting surface, a latch member adapted to hold the arm in an operative position, said latch member also being adapted to frictionally engage the support engaging surface of the arm whereby the arm tends to remain in a set position when moved from the operative position.

14. In a motion picture projector, the combination with a supporting frame having notched edges, of reel supporting members carried by the frame spaced from the notches, pivotal connections between the supporting members and the frame whereby the supporting members may be folded compactly against the frame and into the notches therein.

15. In a motion picture projector, the combination with a base, of a supporting member extending upwardly from the base having a plurality of seats formed therein, reel supporting mechanisms pivotally attached to the supporting members adapted to move into a position in which parts of the mechanism lie in the seats.

16. In a motion picture projector, the combination with a base, of a support extending upwardly therefrom, said support being formed of a relatively flat plate having seats formed therein, of reel supporting mechanism including a flat arm pivoted to the support, said reel supporting mechanism being movable into a position in which parts of the mechanism lie in the seats and in which the flat arm may lie in contact with the flat plate.

17. In a motion picture projector, the combination with a base, of a notched support extending upwardly therefrom, an arm movably mounted on the support and adapted to be moved to an operative and to an inoperative position with respect to said support, a reel carrying member supported by the arm, said member being adapted to lie in the notch of the support when the arm is moved to its inoperative position.

18. In a motion picture projector, the combination with a base, of a support extending upwardly therefrom having spaced notches therein, reel supporting arms movably mounted on the support, projections carried by the arms adapted to co-operate with the film reels, said arms being movable on the support to bring said projections into the notches of the support, whereby the apparatus may be compactly folded.

19. In a motion picture projector, a supporting frame having two edges at an angle one to another, two arms pivoted to the frame adjacent the angle between the edges, and having reel supports, there being seats in the said edges, the arms being adapted to extend from the frame to support reels and being adapted to be folded down beside the edges with the supports lying in the seats, whereby the several parts afford a compact substantially uniform contour.

20. In a motion picture projector, a base, a supporting frame extending upwardly therefrom, two arms movably carried by the frame, each arm having a film reel support and one arm having a film rewinding mechanism, the arms having two positions, in one of which they extend from the frame and are adapted to support film reels in operative position and in the other of which they are folded down within the boundaries of the frame, the frame having in its edges seats to house the reel supports and a part of the rewind mechanism, whereby the projector constitutes a compact body free from protuberances.

21. In a motion picture projector, a base, a compact frame extending upwardly therefrom, mechanism carried by said frame, and limited in extent, and to the boundaries of the frame, arms carried by the frame and having film reel supports and movable to two positions in one of which they extend from the frame and are adapted to support film reels in operative position with respect to the mechanism and in the other of which the arms and reel supports lie within the boundaries of the frame, whereby the frame, mechanism and reel supports afford a compact body without protuberances.

Signed at Rochester, New York, this 28th day of October, 1925.

OTTO WITTEL.